US008538079B2

(12) United States Patent
Chang et al.

(10) Patent No.: US 8,538,079 B2
(45) Date of Patent: Sep. 17, 2013

(54) APPARATUS CAPABLE OF DETECTING LOCATION OF OBJECT CONTAINED IN IMAGE DATA AND DETECTION METHOD THEREOF

(75) Inventors: Yin-Pin Chang, Zhubei (TW);
Wen-Yan Chang, Hsinchu (TW);
Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 172 days.

(21) Appl. No.: 13/227,119

(22) Filed: Sep. 7, 2011

(65) Prior Publication Data

US 2013/0022236 A1    Jan. 24, 2013

(30) Foreign Application Priority Data

Jul. 20, 2011  (TW) .............................. 100125713 A (51) Int. Cl.
*G06K 9/00* (2006.01)
*G06K 9/62* (2006.01)
*G06K 9/36* (2006.01)

(52) U.S. Cl.
USPC ............ 382/103; 382/162; 382/228; 382/288

(58) Field of Classification Search
USPC ........................................ 382/103, 162, 228
See application file for complete search history.

(56) References Cited

U.S. PATENT DOCUMENTS

| 7,558,402 B2 * | 7/2009 | Zhou et al. | 382/103 |
| 7,844,077 B2 * | 11/2010 | Kochi et al. | 382/103 |
| 7,949,150 B2 * | 5/2011 | Haering et al. | 382/103 |
| 8,294,755 B2 * | 10/2012 | Mizuno | 348/68 |

* cited by examiner

*Primary Examiner* — Utpal Shah
(74) *Attorney, Agent, or Firm* — Wang Law Firm; Li K. Wang; Stephen Hsu (57) ABSTRACT

An apparatus capable of detecting location of object contained in image data and its detecting method are disclosed. The apparatus comprises an image capturing module, a weight assignment module, and a processing module. The image capturing module is for capturing an image. The weight assignment module performs the pixel weight/probability assignment according to the priori information and the image, and figures out the initial gravity center of the object according to the object location initialization. The processing module performs the statistical analysis according to the result of the pixel weight/probability assignment and the initial gravity center of the object so as to obtain the analysis result and update the object location. The processing module determines whether or not the analysis result meets the preset value, if it does, the processing module outputs an estimated result; if it doesn't, the processing module repeats the foregoing processes.

16 Claims, 6 Drawing Sheets

APPARATUS CAPABLE OF DETECTING LOCATION OF OBJECT CONTAINED IN IMAGE DATA AND DETECTION METHOD THEREOF

CROSS-REFERENCE TO RELATED APPLICATION

This application claims priority from Taiwan Patent Application No. 100125713, filed on 2011 Jul. 20, the disclosure of which is incorporated herein by reference in its entirety.

BACKGROUND OF THE INVENTION

1. Field of the Invention

The present invention relates to an image detection technology, and more particularly to an image detection technology capable of rapidly detecting the physical location of a specific object within an image through iterative algorithm.

2. Description of the Related Art

Recently, intelligent image detection technology is gaining more and more attention and can be applied to various electronic products, such as digital cameras, somatosensory interaction products and safety monitoring systems can all be equipped with the intelligent image detection technology. In these detection applications, shape information of an object plays a very important role in image detection speed and quality. More sufficient shape information, even an approximated shape, can both greatly accelerate the detection speed and improve the detection quality.

Generally, for estimation of shape information of a specific object in an image, predetermined color information can be utilized to perform pixel-by-pixel comparison, and comparison scope is gradually expanded until color values of pixels in the image are not matched with predetermined conditions. In a field of image segmentation, this manner is frequently used, especially for watershed and region growing manners. Although these manners can provide well estimation effect for objects with pure colors, these manners also have many restrictions on calculation speed, connected component and setting of threshold conditions.

However, in order to perform shape estimation for objects having complicated colors, graph-based method, such as graph-cut and normalized cut, provides an effective solution scheme in recent years. Although the foregoing methods can precisely estimate the shape of the object having complicated colors, the methods also have extremely high complexity at calculation. Similarly, model-based method, such as active contour method, also has the same problem. Therefore, the acceleration of the detection speed, detection quality improvement, restriction of connected component, insufficient flexibility and fault tolerance caused by threshold conditions that are difficult to be defined, and reduction of complexity of estimating the object having complicated colors are the main issues that the present invention is designed to overcome.

SUMMARY OF THE INVENTION

In view of the shortcomings of the prior art, the inventor(s) of the present invention based on years of experience in the related industry to conduct extensive researches and experiments, and finally developed an apparatus capable of detecting location of object contained in image data and its detection method as a principle objective to overcome problems of slow detection speed, poor detection quality, insufficient flexibility or insufficient fault tolerance, restriction of connected component and higher calculation complexity while estimating the object with complicated colors. Thus, the detection function of object location can be applied to a hand-held mobile device having limited computing resources such as digital cameras and cell phones.

To achieve the foregoing objective, the apparatus capable of detecting location of object contained in image data is provided and comprises an image capturing module for capturing image data; a weight assignment module performing a weight assignment based upon a sub-image corresponding to a possible initial location of an object to be detected within the image data and priori information and for calculating an initial gravity center of the object to be detected by utilizing the possible initial location; a processing module performing a statistical analysis based upon a result of the weight assignment and the initial gravity center to calculate a possible location of the object to be detected and to obtain a gravity center coordinate and to determine whether or not a result of the statistical analysis matches a preset value; wherein if the result of the statistical analysis matches the preset value, the processing module generates an estimated result contained the possible location of the object to be detected; if the result of the statistical analysis does not matches the preset value, the processing module replaces the possible initial location with the possible location and calculates the possible location and the gravity center coordinate of the object to be detected once again.

The weight assignment is that the priori information is converted into a probability density function (PDF), and a weight value is respectively assigned for each pixel according to color values (or edge orientation values or its combination) and corresponding values in the PDF of each pixel in the sub-image corresponding to the possible initial location within the image data.

The statistical analysis is performed by utilizing the weight value and calculating a space relationship for each pixel relative to a gravity center so as to compute a weighted covariance matrix of the object to be detected and executing eigen decomposition or singular value decomposition for the weighted covariance matrix.

The preset value is a predetermined precision, a predetermined iterative time or a combination thereof.

The priori information comprises color distribution information, a histogram, an edge orientation/gradient histogram or a combination thereof regarding the object to be detected.

The priori information is generated by training data, manual designation or a clustering manner, and the possible initial location of the object to be detected is generated by manual designation, the clustering manner or random sample consensus.

According to the objective of the invention, a method of detecting location of object contained in image data is further provided and suitable for an application of the apparatus capable of detecting location of object contained in image data. The apparatus comprises an image capturing module, a weight assignment module and a processing module. The method of detecting location of object contained in image data comprises the following steps of capturing image data; performing a weight assignment based upon an sub-image corresponding to a possible initial position of an object to be detected within the image data and priori information of the object to be detected, and calculating an initial gravity center of the object to be detected according to the possible initial location of the object to be detected; performing a statistical analysis based upon a result of the weight assignment and the initial gravity center through a processing module so as to calculate a possible location of the object to be detected and calculate a gravity center coordinate; replacing the possible initial location with the possible location through the processing module and repeating foregoing steps until a result of the statistical analysis matches a preset value; and generating an estimated result contained possible location of the object to be detected.

According to the objective of the invention, an apparatus capable of detecting location of object contained in image data is provided and comprises an image capturing module for capturing image data; a computation module performing a weight assignment based upon a sub-image corresponding to a possible initial location of an object to be detected within the image data and priori information of the object to be detected and for calculating an initial gravity center of the object to be detected by utilizing the possible initial location and performing a statistical analysis based upon a result of the weight assignment and the initial gravity center to calculate a possible location of the object to be detected and to obtain a gravity center coordinate; and a processing module for determining whether or not a result of the statistical analysis matches a preset value; wherein if the result of the statistical analysis matches the preset value, the processing module generates an estimated result contained the possible location of the object to be detected; if the result of the statistical analysis does not matches the preset value, the processing module calculates the possible location and the gravity center coordinate of the object to be detected once again.

According to the objective of the invention, an apparatus capable of detecting location of object contained in image data is provided and comprises an image capturing module for capturing image data; a weight assignment module performing a weight assignment based upon an sub-image corresponding to an initial shape limit frame of an object to be detected within the image data and priori information of the object to be detected and for calculating an initial gravity center of the object to be detected by utilizing the initial shape limit frame; a computation module performing a statistical analysis based upon a result of the weight assignment and the initial gravity center to calculate a shape limit frame of the object to be detected and to obtain a gravity center coordinate; and a processing module for determining whether or not a result of the statistical analysis matches a preset value; wherein if the result of the statistical analysis matches the preset value, the processing module generates an estimated result contained the shape limit frame of the object to be detected; if the result of the statistical analysis does not matches the preset value, the processing module replaces the initial shape limit frame with the shape limit frame and calculates the shape limit frame and the gravity center coordinate of the object to be detected once again.

The apparatus capable of detecting location of object contained in image data and its detection method have one or more advantages as the following:

(1) The apparatus capable of detecting location of object contained in image data and its detection method can accelerate the speed of detecting an object location and improve the quality of detecting the object by obtaining the priori information of colors, edge orientation/gradient histogram.

(2) The apparatus capable of detecting location of object contained in image data and its detection method detect the object location through statistical-based iterative method. Thus, the problem of restriction of connected component can be improved.

(3) The apparatus capable of detecting location of object contained in image data and its detection method repeatedly perform simple calculations such as a PDF and the weighted covariance matrix. Therefore, it does not have excessive calculation complexity even if an object having complicated colors is estimated.

(4) The apparatus capable of detecting location of object contained in image data and its detection method utilize iterative method having simple setting of threshold condition. Therefore, it does have higher flexibility and fault tolerance.

DETAILED DESCRIPTION OF THE PREFERRED EMBODIMENTS

The foregoing and other technical characteristics of the present invention would become apparent with the detailed description of the preferred embodiments and the illustration of the related drawings.

Figure 1:
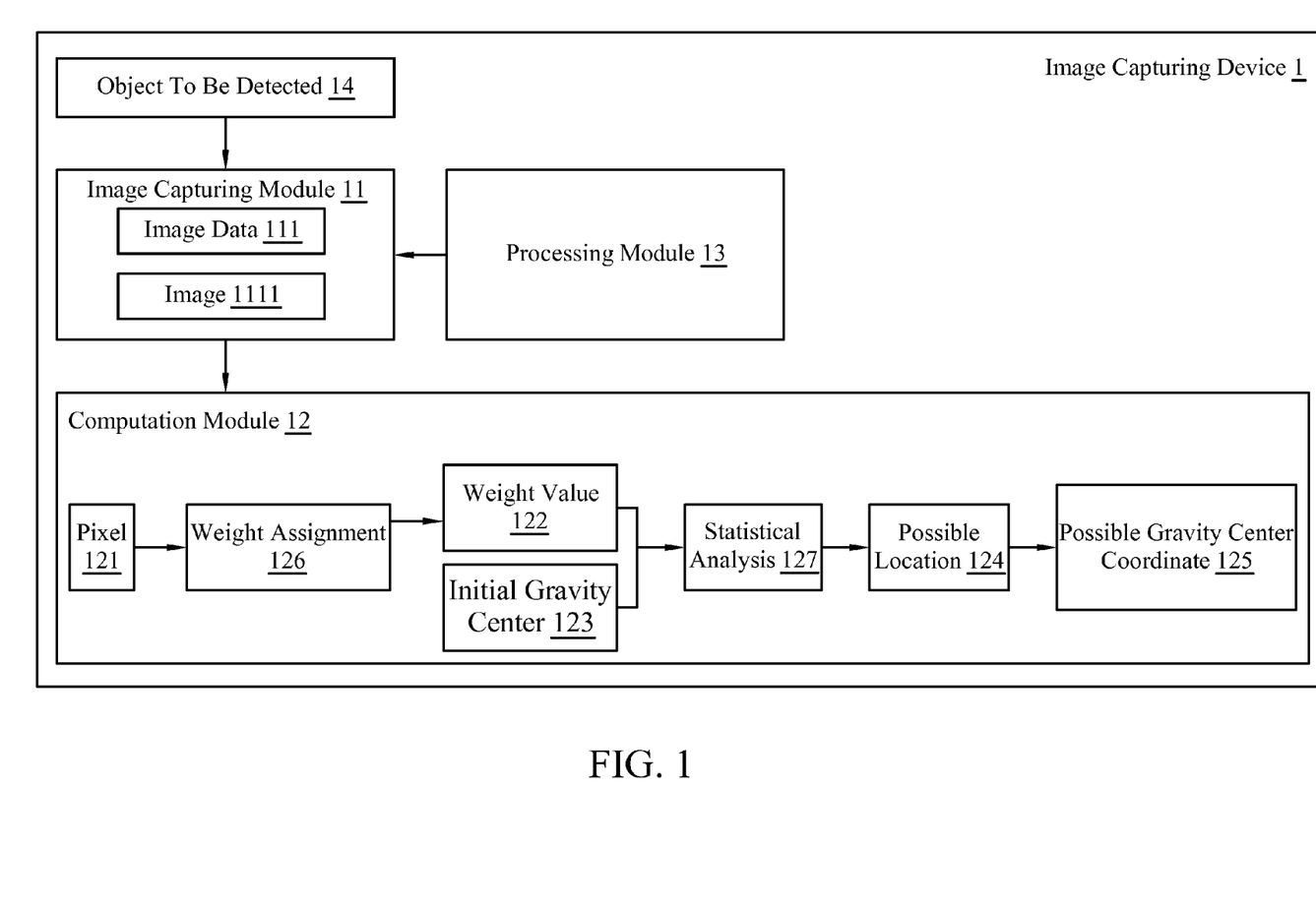
FIG. 1 is a block diagram of an apparatus capable of detecting location of object contained in image data according to a first embodiment of the invention.

With reference to FIG. 1 for a block diagram of an apparatus capable of detecting location of object contained in image data in accordance with a first embodiment of the invention is depicted. As shown in the figure, an image capturing device 1 comprises an image capturing module 11, a computation module 12 and a processing module 13, wherein the computation module 12 is electrically connected to the image capturing module 11 and the processing module 13. The processing module 13 is electrically connected to the image capturing module 11.

The image capturing device 1 can be a diversity of electronic equipment, such as a safety monitoring system, a home video security system, a digital camera, a human computer interface and a somatosensory interactive product, etc, that needs to detect the exact location of a specific object within an image. In order to further understand the technical feature of the invention, the following takes, but not limited, the digital camera as the embodiment.

The image capturing module 11 captures image data 111 of an object to be detected 14. Its computation module 12 performs weight assignment 126 one by one for each pixel 121 in the image 1111 having a specific area (e.g. a possible initial location of the object to be detected 14) within image data 111 according to priori information of the object to be detected 14, thereby obtaining its weight value 122. The possible initial location of the object can be estimated by directly and manually designating the location of the object to be detected 14 that most likely shows up in image data 111 or by algorithms such as clustering and random sample consensus (RANSAC). Since the possible initial location of the object is obtained, an initial gravity center 123 can be calculated.

Priori information integrated in the image capturing device 1 can greatly accelerate object detection speed. Priori information can be color distribution information, a histogram, an edge orientation/gradient histogram or a combination thereof for the object to be detected. In addition, in manners of obtaining priori information, the most frequently seen method is training data. Taking an apple as an example, different types of apple data can be used as a training database for detection basis. In addition, a simple clustering manner or manual designation can be directly used.

Since the foregoing weight value 122 and the initial gravity center 123 are obtained, the computation module 12 can perform statistical analysis 127, wherein the manner is to establish a statistic model, and the statistic model is performed with numerical analysis to calculate a possible location 124 and a gravity center coordinate 125 of the object to be detected. A main shaft of the invention adopts an iterative method to perform weight assignment 126 for many times and the statistical analysis 127 to repeatedly update possible locations of the object. After satisfying certain iterative times or the precision of the object to be detected, the processing module 13 instantly generates an estimation result.

Compared with the conventional technique that utilizes color information to perform pixel-by-pixel comparison and expands comparison scope pixel-by-pixel, the iterative method applied in the invention has a concept and feature of adaptive step-size to greatly improve the detection efficiency.

Figure 2:
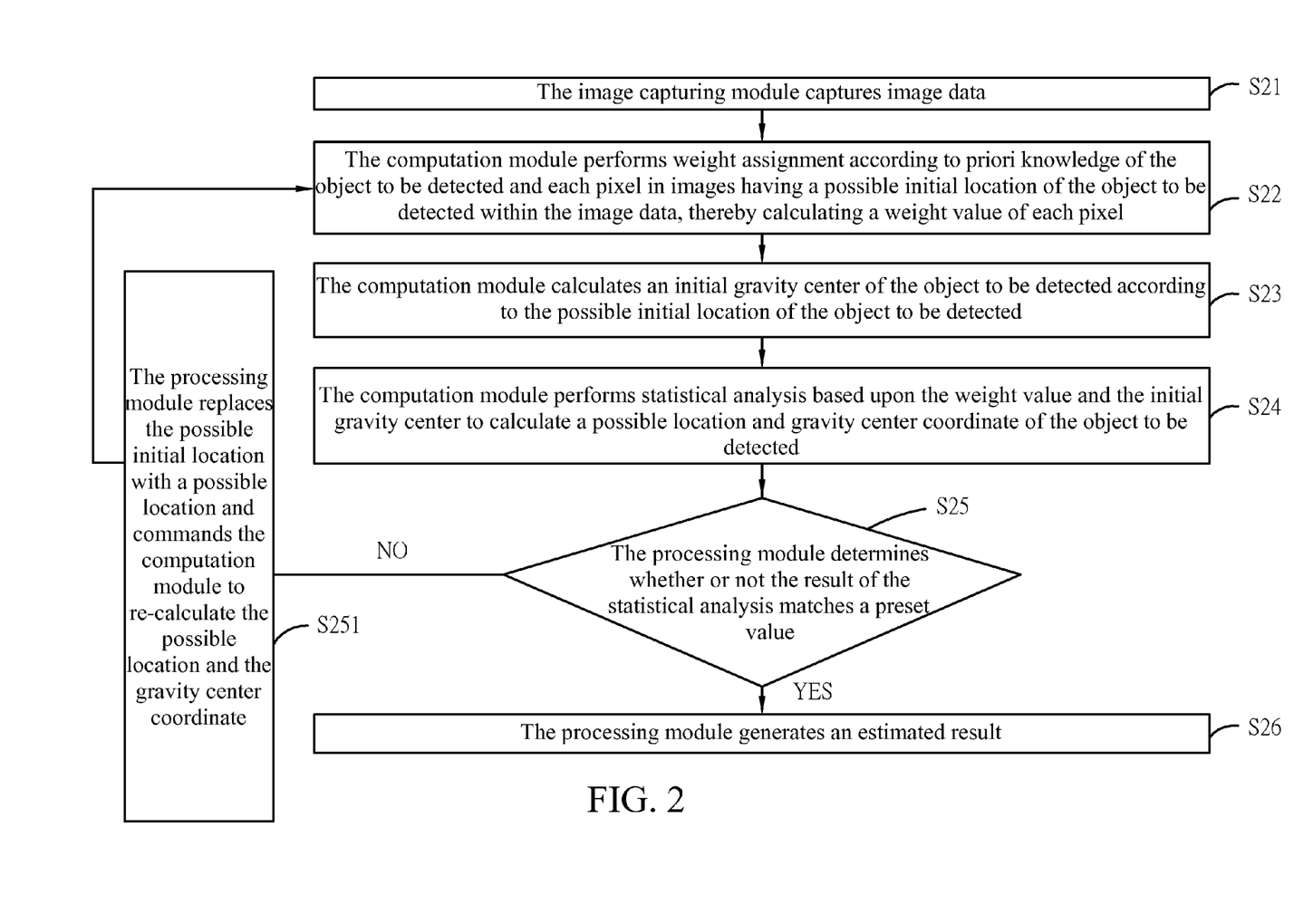
FIG. 2 is a flowchart of an operation of an apparatus capable of detecting location of object contained in image data according to a first embodiment of the invention.

With reference to FIG. 2 for a flowchart of an operation of an apparatus capable of detecting location of object contained in image data according to a first embodiment of the invention is depicted.

In step S21, the image capturing module captures image data.

In step S22, the computation module performs weight assignment according to priori information of the object to be detected and each pixel in images having a possible initial location of the object to be detected within the image data, thereby calculating a weight value of each pixel.

In step S23, the computation module calculates an initial gravity center of the object to be detected according to the possible initial location of the object to be detected.

In step S24, the computation module performs statistical analysis based upon the weight value and the initial gravity center to calculate a possible location and gravity center coordinate of the object to be detected.

In step S25, the processing module determines whether or not the result of the statistical analysis matches a preset value. If the result of the statistical analysis matches the preset value, perform step S26; if the result of the statistical analysis does not match the preset value, return to step S251, the processing module replaces the possible initial location with a possible location and commands the computation module to re-calculate the possible location and the gravity center coordinate.

In step S26, the processing module generates an estimated result.

Figure 3:
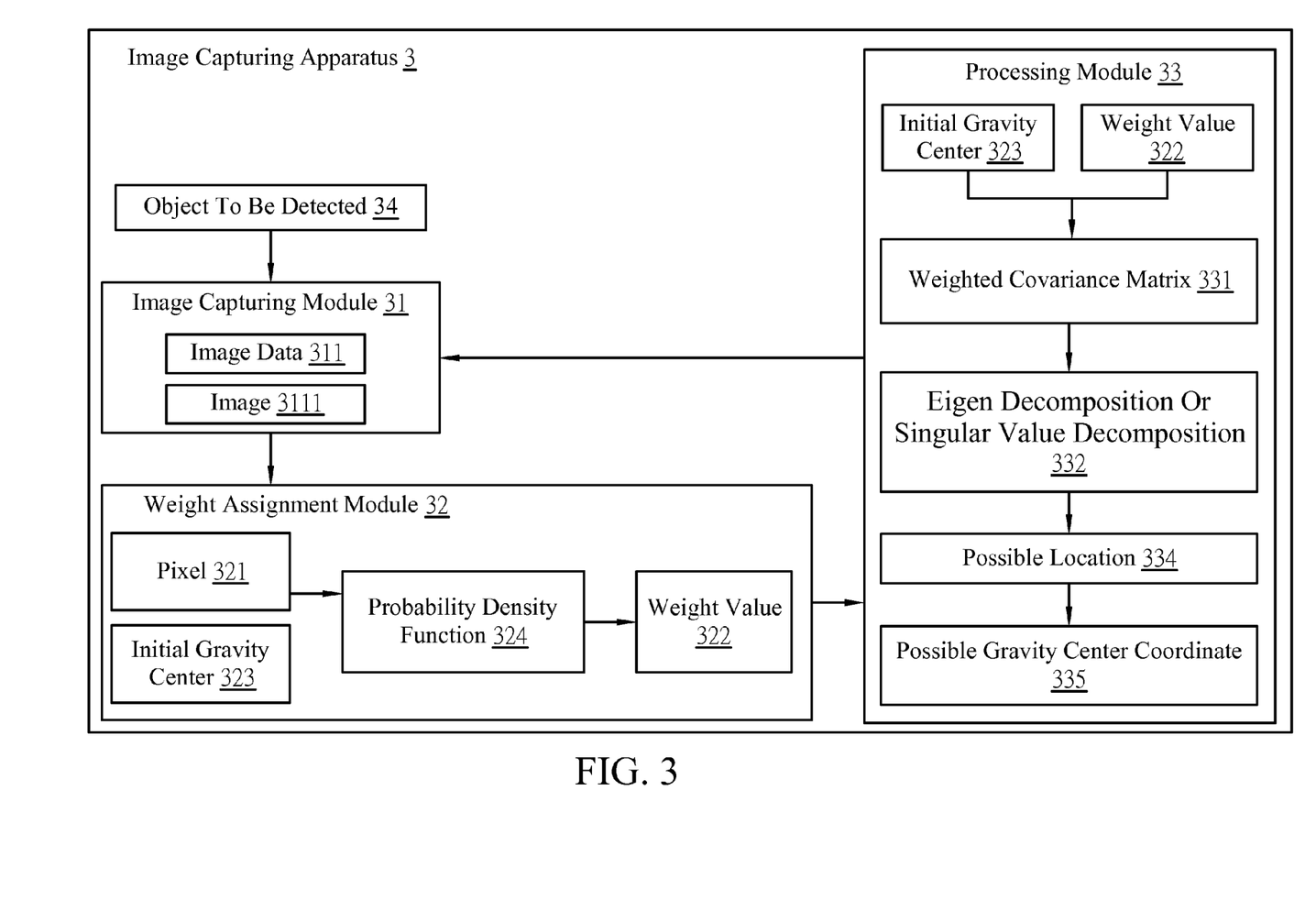
FIG. 3 is a block diagram of an apparatus capable of detecting location of object contained in image data according to a second embodiment of the invention.

With reference to FIG. 3 for a block diagram of an apparatus capable of detecting location of object contained in image data according to a second embodiment of the invention is depicted. As shown in figure, an image capturing apparatus 3 comprises an image capturing module 31, a weight assignment module 32 and a processing module 33, wherein the weight assignment module 32 is electrically connected to the image capturing module 31 and the processing module 33, and the processing module 33 is electrically connected to the image capturing module 31.

Firstly, the image capturing module 31 captures image data 311. The weight assignment module 32 can convert priori information of an object to be detected 34 into probability density function (PDF) 324 and respectively assign a weight value 322 according to color values, edge orientation values, and corresponding values in the PDF 324 of each pixel 321 in an image 3111 having a possible initial location of the object to be detected 34 within image data 311. The possible initial location of the object can be estimated by the foregoing manners. Since the possible initial location of the object is obtained, the initial gravity center 323 can be calculated.

In the meantime, the processing module 33 can use the weight value 322 and calculates a space relationship of each pixel 321 relative to the gravity center to obtain a weighted covariance matrix 331 of the object to be detected 34 and performs eigen decomposition or singular value decomposition 332 for the weighted covariance matrix 331, wherein the eigen value is a long axis and a short axis of a shaped limit frame of the object to be detected 34. The rotation angle of the object to be detected 34 can also be obtained by the eigen value. The possible location 334 (the shaped limit frame) of the object to be detected can be updated by utilizing obtained long axis and the short axis, and the gravity center coordinate 335 is re-obtained to perform the iterative calculation once again. When the possible location 334 of the object to be detected 34 matches a predetermined precision or the iterative times achieve certain predetermined times, the processing module 33 generates an estimated result provided for other processing sequence or application sequence. For example, the estimated result can comprise the possible location 334, which is finally calculated, to provide an object shape recognition processing sequence or an object type recognition processing sequence, thereby narrowing an image field to be processed. Alternatively, an image frame is drawn on a display of the apparatus and seen by a user according to the possible location 334 that is finally calculated.

It should be noted that the iterative method used in the invention takes statistic theory, such as PDF, as a basis. In another word, compared with conventional pixel-based methods such as watershed method and region growing algorithm, the method used by the invention can improve the problem of restriction of connected component. In addition, the termination condition setting of iterative method is extremely easy as well to have better flexibility and fault tolerance in comparison with the conventional techniques.

Further, those people who have ordinary skill in the art can randomly combine each functional module together to form an integrated apparatus and also separate each functional module to form several apparatuses having detail functionality.

Figure 4:
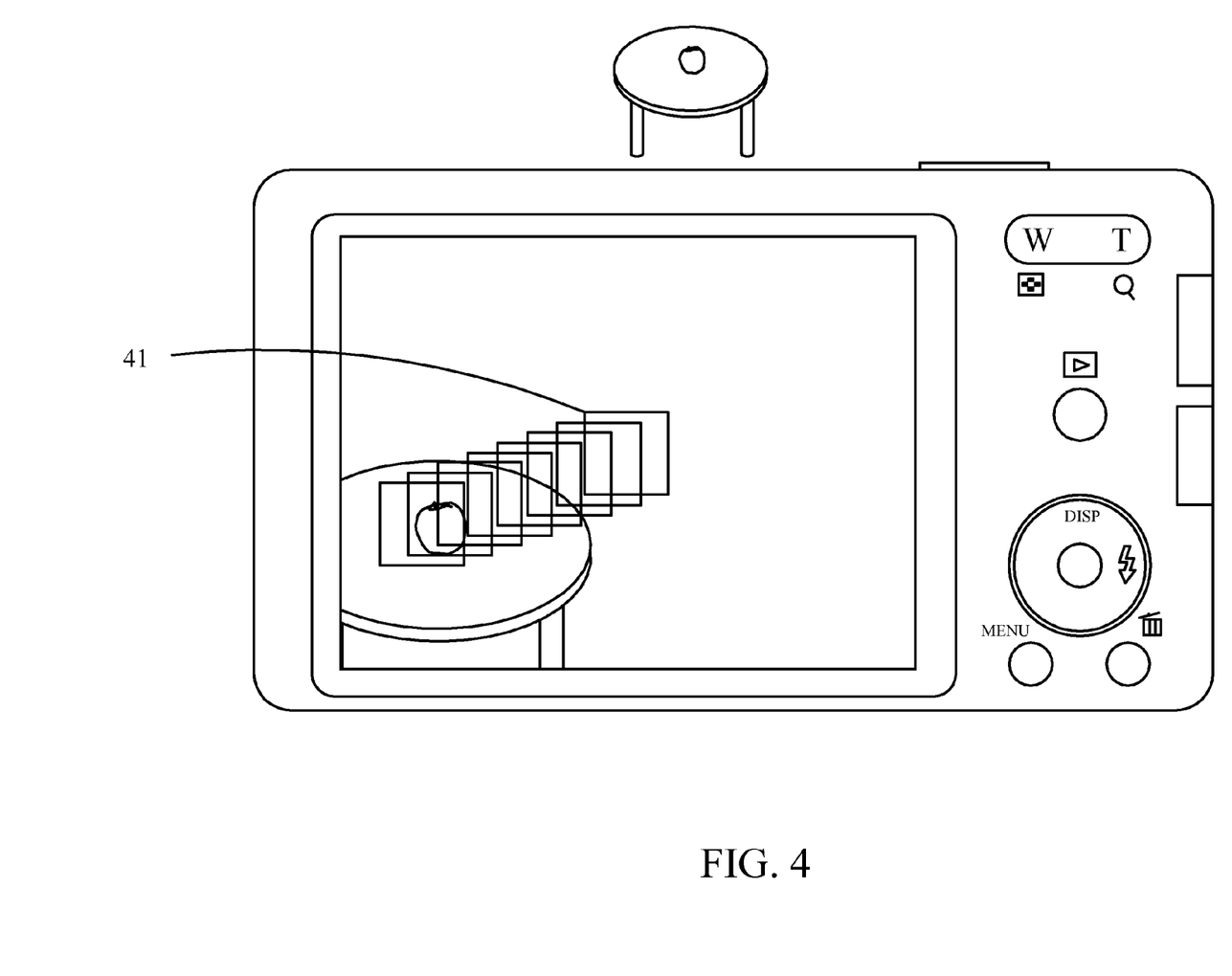
FIG. 4 is a schematic diagram of an apparatus capable of detecting location of object contained in image data according to a second embodiment of the invention.

With reference to FIG. 4 for a schematic diagram of an apparatus capable of detecting location of object contained in image data according to a second embodiment of the invention is depicted. As shown in the figure, the user operates a digital camera to take an image. A preset initial shape limit frame 41 (e.g. a possible initial location of an apple) of the apple is a location at a middle of a lens. In the meantime, the weight assignment module analyzes each pixel in the image within the initial shape limit frame 41 and converts priori information of the apple into a PDF and respectively assigns weight values for each pixel according to the PDF and further calculates an initial gravity center based upon the initial shape limit frame 41. The computation module performs the computation of the foregoing weighted covariance matrix to update the location of the shape limit frame. As shown in the figure, it can be seen that after performing iterative calculation for eight times, the detected result is quite accuracy.

The apparatus of the invention does not need to establish feature data of the object to be detected in advance. Therefore, the apparatus can be applied, but not limited to the application of the digital camera, to different kinds of systems that need to detect specific object locations such as a family video security system or is further applied to a traffic safety monitoring system to monitor whether or not vehicles are parking illegally or facing abnormal conditions.

Figure 5:
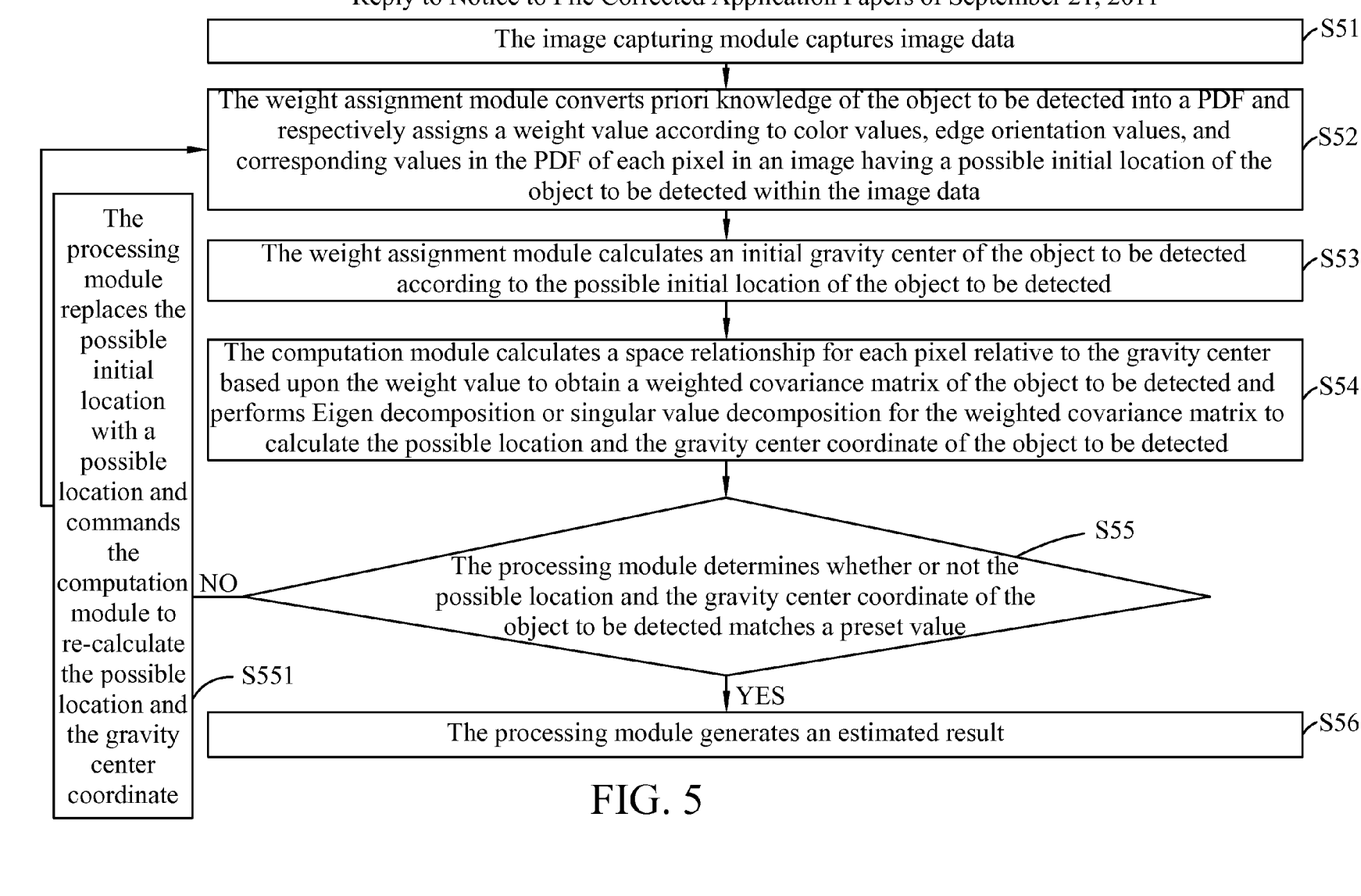
FIG. 5 is a flowchart of an operation of an apparatus capable of detecting location of object contained in image data according to a second embodiment of the invention.

With reference to FIG. 5 for a flowchart of an operation of an apparatus capable of detecting location of object contained in image data according to a second embodiment of the invention is depicted.

In step S51, the image capturing module captures image data.

In step S52, the weight assignment module converts priori information of the object to be detected into a PDF and respectively assigns a weight value according to color values, edge orientation values, and corresponding values in the PDF of each pixel in a sub-image corresponding to a possible initial location of the object to be detected within the image data.

In step S53, the weight assignment module calculates an initial gravity center of the object to be detected according to the possible initial location of the object to be detected.

In step S54, the computation module calculates a space relationship for each pixel relative to the gravity center based upon the weight value to obtain a weighted covariance matrix of the object to be detected and performs eigen decomposition or singular value decomposition for the weighted covariance matrix to calculate the possible location and the gravity center coordinate of the object to be detected.

In step S55, the processing module determines whether or not the possible location and the gravity center coordinate of the object to be detected matches a preset value. If the result of the statistical analysis matches the preset value, perform step S56; If the result of the statistical analysis does not match the preset value, perform step S551, the processing module replaces the possible initial location with a possible location and commands the computation module to re-calculate the possible location and the gravity center coordinate.

In step S56, the processing module generates an estimated result.

Figure 6:
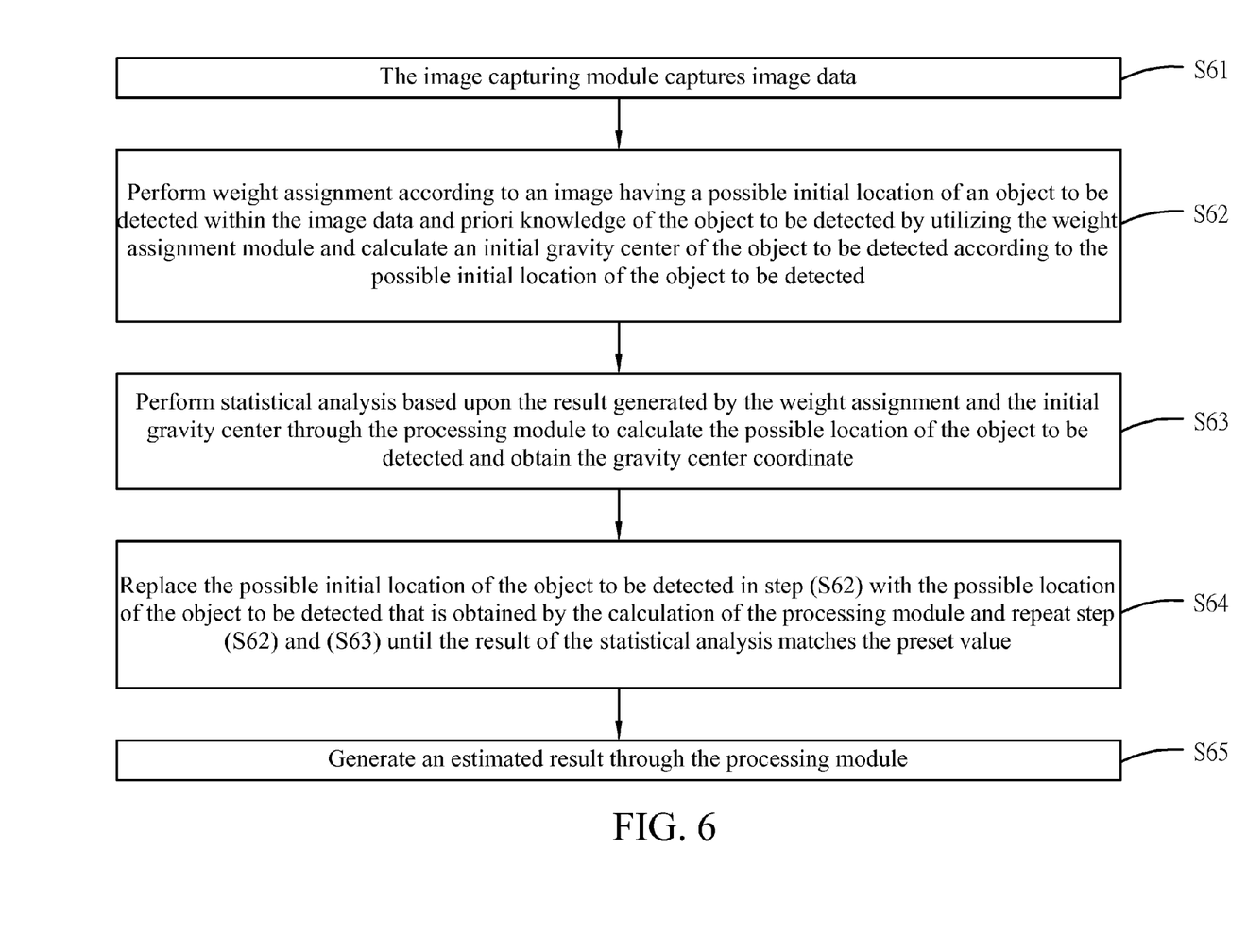
FIG. 6 is a flowchart of a method of detecting location of object contained in image data according to the invention.

With reference to FIG. 6 for a flowchart of a method of detecting object according to the invention is depicted. As shown in the figure, the method of detecting object of the invention is applied to an apparatus capable of detecting location of object contained in image data. The apparatus comprises an image capturing module, a weight assignment module, a computation module and a processing module. The method of detecting object comprises the following steps:

(S61) capture image data through the image capturing module;

(S62) perform weight assignment according to a sub-image corresponding to a possible initial location of an object to be detected within the image data and priori information of the object to be detected by utilizing the weight assignment module and calculate an initial gravity center of the object to be detected according to the possible initial location of the object to be detected;

(S63) perform statistical analysis based upon the result of the weight assignment and the initial gravity center through the processing module to calculate the possible location of the object to be detected and obtain the gravity center coordinate;

(S64) replace the possible initial location of the object to be detected in step (S62) with the possible location of the object to be detected that is obtained by the calculation of the processing module and repeat step (S62) and (S63) until the result of the statistical analysis matches the preset value; and (S65) generate an estimated result contained possible location of the object to be detected.

The detail depiction and embodiments of the method of detecting object according to the invention have been described while depicting the apparatus capable of detecting location of object contained in image data, and repeat depiction is unnecessary herein.

The apparatus capable of detecting location of object contained in image data and its detection method utilize priori information and statistical-based iterative method to estimate the shapes and location of a specific object in the image capturing device. Therefore, it can improve a problem of restriction of connected component and also improve the detection speed and the quality. In addition, the iterative method of the invention repeatedly performs simple calculation such as the PDF and weighted covariance matrix. Accordingly, compared with the conventional technique, the calculation complexity is low, and the setting of threshold condition is also easy. For example, the termination condition can be set by using times of iterative method. Thus it can be extremely suitable for the application of an intelligent image detection technique.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. An apparatus capable of detecting location of object contained in image data comprising:
    an image capturing module for capturing image data;
    a weight assignment module performing a weight assignment based upon a sub-image corresponding to a possible initial location of an object to be detected within the image data and priori information of the object to be detected, and calculating an initial gravity center of the object to be detected by utilizing the possible initial location; and
    a processing module performing a statistical analysis based upon a result of the weight assignment and the initial gravity center to calculate a possible location of the object to be detected and to obtain a gravity center coordinate, and determining whether or not a result of the statistical analysis matches a preset value; wherein if the result of the statistical analysis matches the preset value, the processing module generates an estimated result contained the possible location of the object to be detected; if the result of the statistical analysis does not matches the preset value, the processing module replaces the possible initial location with the possible location and calculates the possible location and the gravity center coordinate of the object to be detected once again.

2. The apparatus capable of detecting location of object contained in image data as recited in claim 1, wherein the weight assignment is performed by converting the priori information into a probability density function (PDF) and respectively assigning a weight value for each pixel according to color values, edge orientation values and corresponding values in the PDF of each pixel in the sub-image corresponding to the possible initial location within the image data.

3. The apparatus capable of detecting location of object contained in image data as recited in claim 2, wherein the statistical analysis is performed by utilizing the weight value and calculating a space relationship for each pixel relative to a gravity center so as to compute a weighted covariance matrix of the object to be detected and executing eigen decomposition or singular value decomposition for the weighted covariance matrix.

4. The apparatus capable of detecting location of object contained in image data as recited in claim 1, wherein the preset value is a predetermined precision, a predetermined iterative time or a combination thereof.

5. The apparatus capable of detecting location of object contained in image data as recited in claim 1, wherein the priori information comprises color distribution information, a histogram, an edge orientation and gradient histogram or a combination thereof regarding the object to be detected.

6. The apparatus capable of detecting location of object contained in image data as recited in claim 1, wherein the priori information is generated by training data, manual designation or a clustering manner, and the possible initial location of the object to be detected is generated by the manual designation, the clustering manner or random sample consensus.

7. A method of detecting location of object contained in image data, comprising steps of:
capturing image data;
performing a weight assignment based upon an sub-image corresponding to a possible initial location of an object to be detected within the image data and priori information of the object to be detected, and calculating an initial gravity center of the object to be detected according to the possible initial location;
performing a statistical analysis based upon a result of the weight assignment and the initial gravity center, so as to calculate a possible location of the object to be detected and calculating a gravity center coordinate;
replacing the possible initial location with the possible location through the processing module and repeating foregoing steps until a result of the statistical analysis matches a preset value; and
generating an estimated result contained possible location of the object to be detected.

8. The method of detecting location of object contained in image data as recited in claim 7, wherein the weight assignment is that the priori information is converted into a probability density function (PDF), and a weight value is respectively assigned for each pixel according to color values, edge orientation values and corresponding values in the PDF of each pixel in the sub-image corresponding to the possible initial location within the image data.

9. The method of detecting location of object contained in image data as recited in claim 8, wherein the statistical analysis is performed by utilizing the weight value and calculating a space relationship for each pixel relative to a gravity center so as to compute a weighted covariance matrix of the object to be detected and executing eigen decomposition or singular value decomposition for the weighted covariance matrix.

10. The method of detecting location of object contained in image data as recited in claim 7, wherein the preset value is a predetermined precision, a predetermined iterative time or a combination thereof.

11. The method of detecting location of object contained in image data as recited in claim 7, wherein the priori information comprises color distribution information, a histogram, an edge orientation and gradient histogram or a combination thereof regarding the object to be detected.

12. The method of detecting location of object contained in image data as recited in claim 7, wherein the priori information is generated by training data, manual designation or a clustering manner, and the possible initial location of the object to be detected is generated by the manual designation, the clustering manner or random sample consensus.

13. An apparatus capable of detecting location of object contained in image data comprising:
an image capturing module for capturing image data;
a weight assignment module performing a weight assignment based upon an image within an initial shape limit frame of an object to be detected within the image data and priori information of the object to be detected and for calculating an initial gravity center of the object to be detected by utilizing the initial shape limit frame;
a computation module performing a statistical analysis based upon a result of the weight assignment and the initial gravity center so as to calculate a shape limit frame of the object to be detected and obtain a gravity center coordinate; and
a processing module for determining whether or not a result of the statistical analysis matches a preset value; wherein if the result of the statistical analysis matches the preset value, the processing module generates an estimated result contained the possible location of the object to be detected; if the result of the statistical analysis does not matches the preset value, the initial shape limit frame is replaced with the shape limit frame to calculate the shape limit frame and the gravity center coordinate of the object to be detected once again.

14. The apparatus capable of detecting location of object contained in image data as recited in claim 13, wherein the weight assignment is that the priori information is converted into a probability density function (PDF), and a weight value is respectively assigned for each pixel according to color values, edge orientation values and corresponding values in the PDF of each pixel in the image within the initial shape limit frame.

15. The apparatus capable of detecting location of object contained in image data as recited in claim 14, wherein the statistical analysis is performed by utilizing the weight value and calculating a space relationship for each pixel relative to a gravity center so as to compute a weighted covariance matrix of the object to be detected and executing eigen decomposition or singular value decomposition for the weighted covariance matrix.

16. The apparatus capable of detecting location of object contained in image data as recited in claim 13, wherein the preset value is a predetermined precision, a predetermined iterative time or a combination thereof.

* * * * *